(12) United States Patent
Nozaki et al.

(10) Patent No.: US 8,493,841 B2
(45) Date of Patent: Jul. 23, 2013

(54) WIRELESS COMMUNICATION SYSTEM AND NODES

(75) Inventors: Masanori Nozaki, Osaka (JP);
Kentarou Yanagihara, Hyogo (JP);
Hiroshi Nishimura, Osaka (JP); Yuki Kubo, Osaka (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 301 days.

(21) Appl. No.: 12/926,886

(22) Filed: Dec. 15, 2010

(65) Prior Publication Data
US 2011/0235504 A1 Sep. 29, 2011

(30) Foreign Application Priority Data
Mar. 26, 2010 (JP) ................................. 2010-072961

(51) Int. Cl.
*G01R 31/00* (2006.01)
(52) U.S. Cl.
USPC .......................................... 370/221; 370/242
(58) Field of Classification Search
USPC .................. 370/216, 229, 230, 231, 235, 242, 370/246, 252, 254, 328, 329
See application file for complete search history.

(56) References Cited

U.S. PATENT DOCUMENTS

| | | |
|---|---|---|
| 2003/0020977 A1* | 1/2003 | Smith et al. .................... 359/110 |
| 2009/0201899 A1* | 8/2009 | Liu et al. ......................... 370/338 |

OTHER PUBLICATIONS

"ZigBee Specification" (ZigBee Document 053474r17), ZigBee Standards Organization, Oct. 19, 2007.
E. Ilker Oyman, Cem Ersoy "Multiple Sink Network Design Problem in Large ScaleWireless Sensor Networks," Proc. International Conference on Communications, 2004.

* cited by examiner

*Primary Examiner* — Yemane Mesfin
*Assistant Examiner* — Mon Cheri Davenport
(74) *Attorney, Agent, or Firm* — Rabin & Berdo, P.C.

(57) ABSTRACT

A wireless communication system includes a first node, multiple second nodes, and multiple third nodes that communicate with the first node through the second nodes. The second and third nodes transmit control information to their neighboring third nodes, which calculate link costs from the reception status of the control information. The control information transmitted by each node includes a path cost indicating the cost of a path between the transmitting node and the first node. From the path costs in received control information, each third node selects a second node through which to communicate with the first node, and selects a parent node as the destination of the first hop on the path through the selected second node to the first node. Routing is thereby accomplished autonomously without having the second nodes flood the system with routing requests.

15 Claims, 17 Drawing Sheets

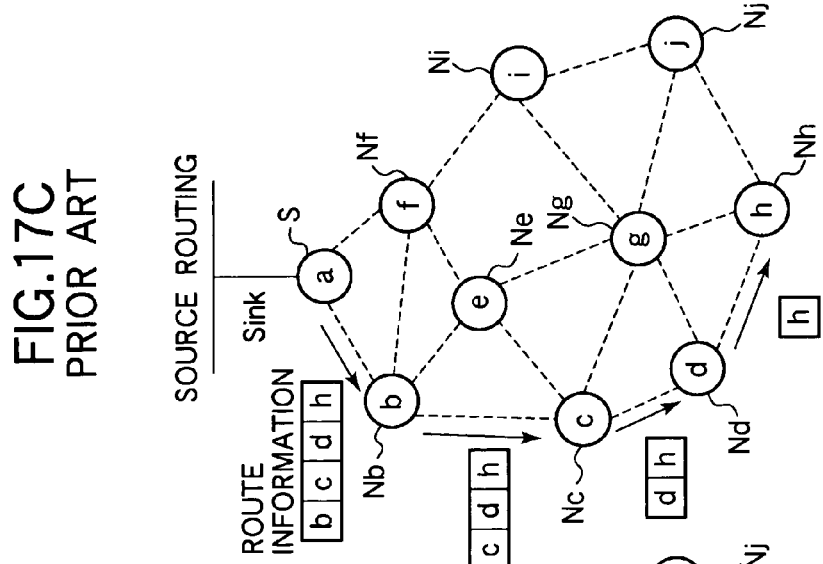
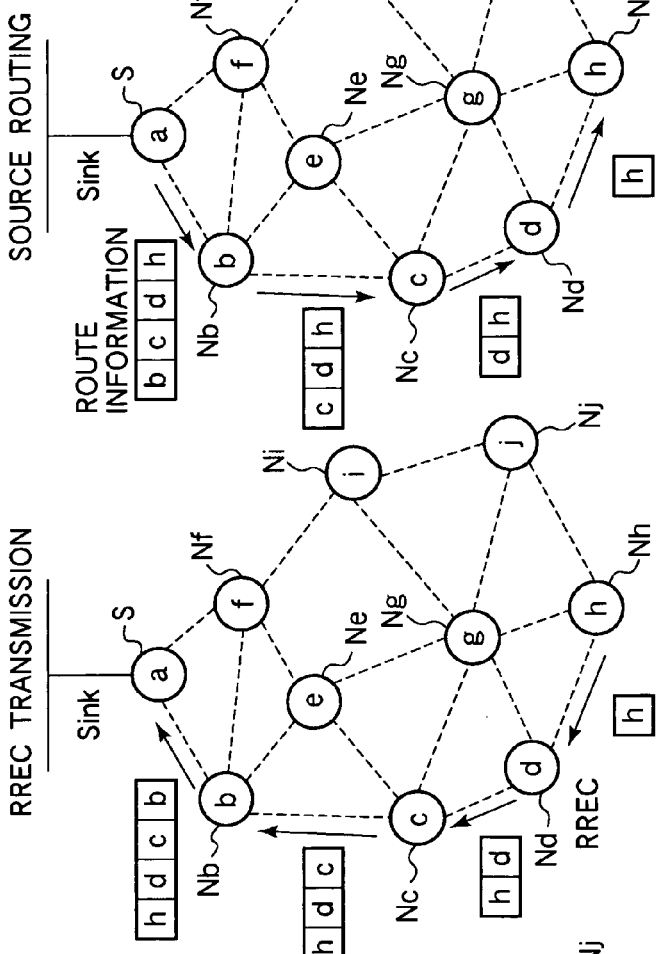
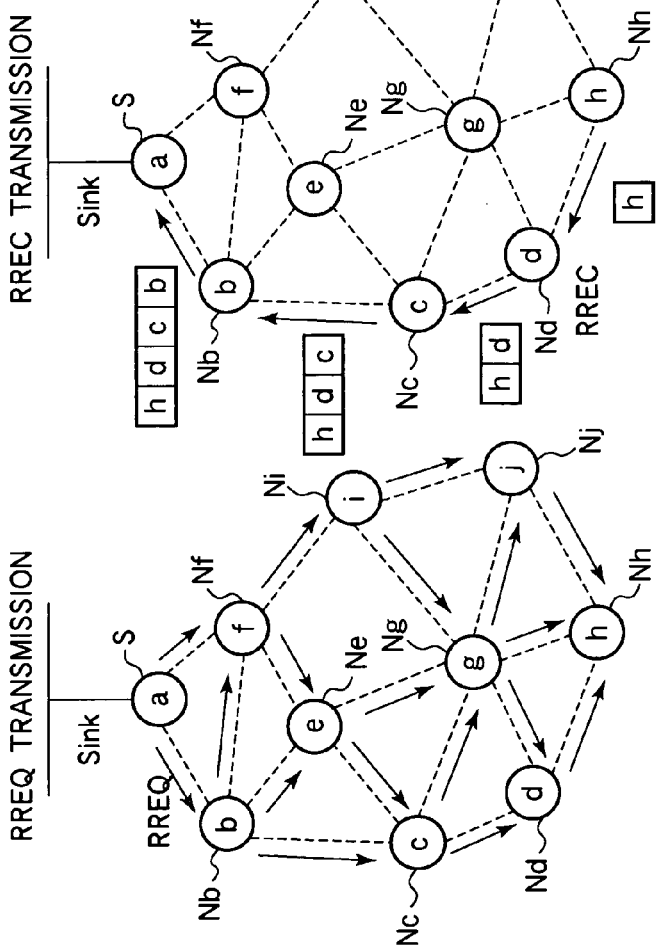

WIRELESS COMMUNICATION SYSTEM AND NODES

BACKGROUND OF THE INVENTION

1. Field of the Invention

The present invention relates to a multi-hop wireless communication system and its nodes.

2. Description of the Related Art

A multi-hop wireless communication system enables wireless nodes that are not within direct radio range of each other to communicate by relay through intermediate wireless nodes. Various routing protocols are used to ensure that communications are relayed over appropriate routes. For example, in ZigBee Specification Revision 17 (ZigBee Document 053474r17), the ZigBee Alliance has standardized a many-to-one routing protocol that enables a so-called sink node to collect data efficiently from a plurality of other nodes. Applications in environmental sensing and telemetering are envisioned.

The ZigBee protocol and other similar protocols are based on link costs. A link cost is quantity that indicates the quality or reliability of a direct (one-hop) wireless link between two neighboring nodes. In one implementation of the ZigBee system, each wireless node transmits link status packets (called frames) at, for example, 15-second intervals to its neighboring nodes. The nodes at the two ends of a direct wireless link can determine the cost of the link by measuring the percentage of these transmitted packets that are successfully received, by measuring the signal strength and/or data quality of the received packets, or by using a link quality indicator (LQI) provided in the packets.

The ZigBee many-to-one routing system is illustrated in FIGS. 17A to 17C for a network in which a sink node S (marked 'a') collects sensing data from nodes Nb to Nj (marked 'b' to 'j'). The sink node S may submit the collected data to another device (not shown) via another network, indicated by the horizontal line at the top of these drawings. A typical one of nodes Nb to Nj will be referred to simply as a node N.

In FIG. 17A, the sink node S has broadcast a route request (RREQ) command. In ad-hoc on-demand distance vector routing schemes this command is commonly used to find a route between specific nodes, but in many-to-one routing this command is transmitted with a broadcast address and is used to enable an arbitrary node N to find a route to the sink node S.

A node N that receives the RREQ command relays it to other neighboring nodes. The relay processing includes adding the link cost of the link by which the command was received to a path cost value in the command, so that the path cost indicates the cumulative cost of the path taken by the packet from node S to node N. By selecting the neighboring node from which the RREQ command is received with the lowest path cost, for example, a node N can determine the best node to which to relay packets destined for node S. As the RREQ command propagates through the network, upstream paths from each node N to the sink node S are established.

In FIG. 17B, node Nh has transmitted a route record (RREC) command to establish a downstream path to itself from the sink node S. Each node that receives the RREC command adds its own address to a list of addresses in the command and relays the command toward node S. When the RREC command reaches node S, node S stores the address list, which indicates the path taken by the command (Nh to Nd to Nc to Nb to S).

In FIG. 17C, the sink node S has received RREC commands from all nodes N in the network and has acquired address lists describing a path to itself from each node N. When the sink node S transmits a packet to a specific node, it reads the address list from that node in reverse and places the reversed address list in the header of the packet. A node that receives the packet deletes its own address and relays the packet to the next node in the address list.

As network size increases, however, the concentration of all network traffic onto a single sink node leads to problems. One proposed solution is a network with a plurality of sink nodes that share the traffic load. An example of this type of multiple-sink network can be found in Oyman et al., 'Multiple Sink Network Design Problem in Large Scale Wireless Sensor Networks', Proc. International Conference on Communications (2004).

The existence of a plurality of sink nodes in a network enables an arbitrary node to discover an upstream path to each sink node, select the path with the lowest cost, and associate with or 'connect to' the sink node at the end of that path. This process tends to balance the loads on the sink nodes by balancing the numbers of nodes to which they are connected. However, to ensure that a RREQ command will be relayed throughout the network, the time-to-live (TTL) field in this command, which specifies the maximum number of times the command can be relayed, must be set to a large initial value such as 255. As a result, the amount of network traffic used for relaying RREQ commands increases, and the data communication throughput of the network suffers correspondingly.

Another advantage cited for having multiple sink nodes in a network is that if a sink node fails, its connections can be shifted to other sink nodes. With conventional many-to-one routing, however, in which once a node has selected a low cost path it continues to select that path until it receives a RREQ command with a lower path cost, a node that has a multi-hop connection to the failed sink node has no ready way to detect that the sink node to which it is connected has failed.

A further problem is that to switch its connection from a first sink node that has failed to a second sink node that is working, a node must inform the second sink node of the switchover. This can be done by transmitting a RREC command to the second sink node, but if all the nodes that switch their connections from the first sink node to the second sink node send RREC commands at the same time, the resulting concentration of traffic on the second sink node leads to collisions and other problems, and the second sink node may be unable to obtain accurate information about the nodes to which it is now connected.

There is accordingly a need for a multi-hop communication system with multiple sink nodes that generates less routing traffic and can respond more efficiently to sink node failures.

SUMMARY OF THE INVENTION

An object of the present invention is to establish routes in a wireless communication network autonomously without requiring multiple nodes to flood the network with routing control information.

Another object of the invention is to select new routes promptly when a node fails.

Yet another object is to avoid unnecessary concentration of routing traffic on a node on which the newly selected routes converge.

The present invention provides a novel wireless communication system including a first node, a plurality of second nodes, and a plurality of third nodes. The third nodes communicate with the first node through the second nodes. The second and third nodes transmit control information to their neighboring second and third nodes. The third nodes calculate link costs of single-hop wireless links with their neighboring second and third nodes from reception status of the control information.

The control information transmitted by each second node includes a path cost indicating the cost of the path from the first node to the second node.

The control information transmitted by each third node includes a path cost indicating the cost of a path from the first node to the third node. The third node calculates this path cost by adding the link cost of a link by which the third node receives control information from a neighboring node to the path cost included in the received control information.

Each third node uses the control information it receives from its neighboring nodes to select one of the second nodes through which to communicate with the first node and select a parent node that functions as the destination of the first hop when the third node communicates with the first node.

This routing scheme avoids the need for each of the second nodes to flood the entire network with routing control information such as RREQ packets.

The control information transmitted by each third node may also include the identities of the second node and parent node selected by the third node.

The first node may be operative to detect failed second nodes and notify the third nodes of such failures. Third nodes that were communicating with the first node via a failed second node can then promptly select a different second node and a new parent node.

When a third node selects a second node and parent node, it may also transmit routing information such as a route record packet to the first node to enable the first node to learn the route to the third node. After changing its second node selection in response to notification that the second node has failed, the third node may temporarily delay the transmission of such routing information if the third node is selected as the parent node of another third node, and transmit the routing information immediately if it is not selected as the parent node of any other node. Nodes farther from the failed second node preferably delay the transmission of the routing information for longer times, and ultimately cancel the transmission if they have already relayed routing information received from another third node. This scheme avoids the redundant transmission of routing information and can thereby avoid a needless concentration of routing traffic on a second node that is newly selected by several third nodes.

BRIEF DESCRIPTION OF THE DRAWINGS

In the attached drawings:

FIGS. 17A to 17C illustrate routing operations in a conventional wireless communication system.

DETAILED DESCRIPTION OF THE INVENTION

Figure 1:
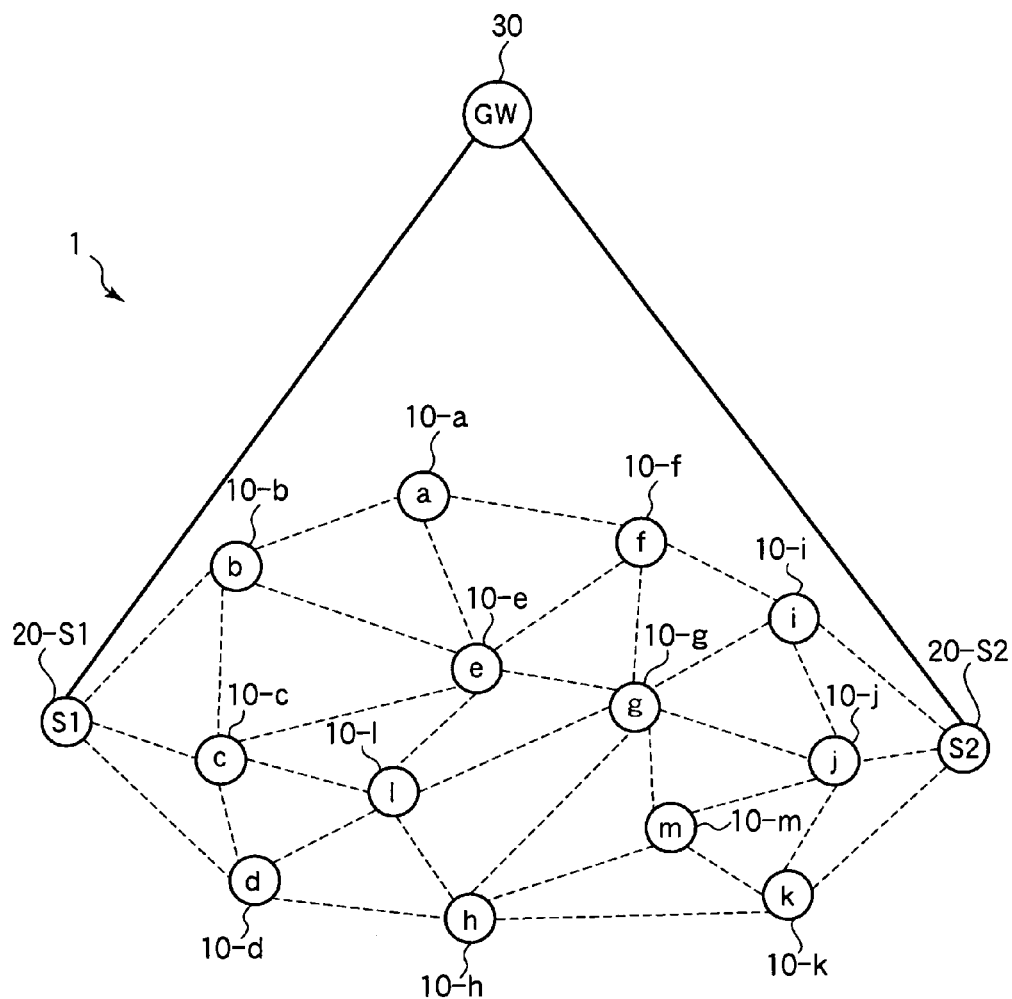
FIG. 1 illustrates the overall structure of a wireless communication system according to a first embodiment of the invention.

Embodiments of the invention will now be described with reference to the attached drawings, in which like elements are indicated by like reference characters. The first node in each embodiment will be referred to as the gateway, the second nodes as sink nodes, and the third nodes simply as wireless nodes.

First Embodiment

Referring to FIG. 1, the first embodiment is a wireless communication system 1 including wireless nodes 10-*a* to 10-*m*, a pair of sink nodes 20-S1 and 20-S2, and a gateway (GW) 30. For brevity, reference numeral 10 will be used when it is not necessary to identify the wireless nodes individually, and reference numeral 20 when it is not necessary to identify the sink nodes individually.

The gateway 30 is connected by a wireline network to the two sink nodes 20. In the following description, each sink node 20 has a direct wireline link to the gateway 30, as shown. In general, the wireline network may include intermediate nodes (not shown) between the gateway 30 and sink node 20. The sink nodes 20 function as relay nodes through which the wireless nodes 10 are connected to the gateway 30.

The wireless nodes 10 form a multi-hop sensor network. Each wireless node 10 acquires data from a sensor (not shown), and sends the data through one of the sink nodes 20 to the gateway 30, which then transmits the data to an information collecting device (not shown). Alternatively, the gateway 30 itself may function as the information collecting device. A wireless node 10 that cannot communicate directly with either sink node 20 selects one of the sink nodes 20 and communicates with it by multi-hop communication relayed through one or more intermediate wireless nodes 10.

In FIG. 1 and the subsequent network drawings in the first embodiment, dotted lines are used to indicate direct (one-hop) wireless communication links. For example, wireless node 10-*b* in FIG. 1 can communicate directly with sink node 20-S1 and wireless nodes 10-*a*, 10-*c*, and 10-*e*.

Each of the wireless communication links indicated by the dotted lines has an associated link cost. The wireline path from each sink node to the gateway 30 has an associated path cost. A path from a wireless node 10 via a sink node 20 to the gateway 30 also has an associated path cost, which is the sum of the link costs of the wireless links on the path from the wireless node 10 to the sink node 20 and the path cost of the wireline path from the sink node 20 to the gateway 30. In the following description, smaller link costs and path costs indicate higher link or path quality.

Figure 2:
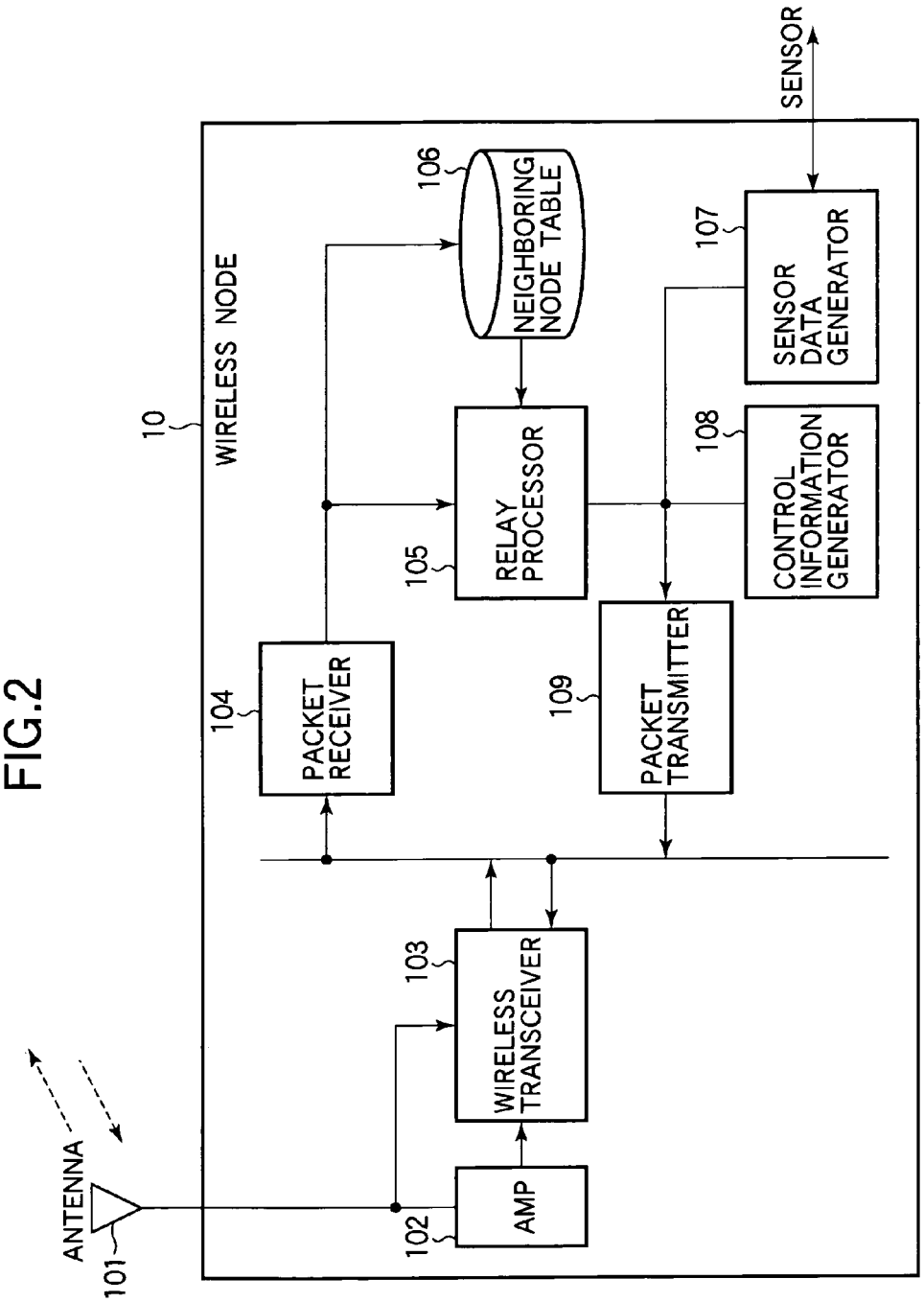
FIG. 2 is a block diagram illustrating the functional structure of the third nodes or wireless nodes in the first embodiment.

Referring to FIG. 2, each of the wireless nodes 10 includes an antenna 101, an amplifier (amp) 102, a wireless transceiver 103, a packet receiver 104, a relay processor 105, a neighboring node table 106, a sensor data generator 107, a control information generator 108, and a packet transmitter 109. The wireless node 10 may be configured by installing programs with the functions of the necessary blocks in FIG. 2 in a node that already has the interfaces and processors needed for wireless communication and data processing.

The antenna 101 transmits and receives radio-frequency wireless signals.

The amplifier 102 amplifies the strength of the signals to be transmitted from the antenna 101.

The wireless transceiver 103 performs modulation, demodulation, frequency conversion, and other processes necessary to convert between the radio-frequency wireless signals transmitted and received by the antenna 101 and the electrical signals processed within the wireless node 10.

The packet receiver 104 analyzes each received packet to determine whether it is a data packet or a control packet. The packet receiver 104 analyzes the content of control packets and updates the neighboring node table 106 as necessary. The packet receiver 104 passes data packets to the relay processor 105.

The relay processor 105 selects a sink node and parent node through which the wireless node 10 communicates with the gateway 30. The wireless node 10 is said to be connected to the selected sink node 20, even if the connection is an indirect connection via a multi-hop path. The relay processor 105 also decides, by referring to the address information in a received data packet, whether the data packet is to be relayed to another node, and if so, sends the packet to the packet transmitter 109 with appropriate address information. In carrying out these operations the relay processor 105 refers to the information in the neighboring node table 106. If a data packet is not to be relayed, it is processed locally by a processor not shown in the drawings.

The neighboring node table 106 is a rewritable memory area that stores routing information derived from control packets received from neighboring nodes (nodes with which the wireless node 10 can communicate in a single hop). In particular, the neighboring node table 106 stores the link costs of the links with neighboring nodes and the path costs of the paths between the neighboring nodes and the gateway 30.

The sensor data generator 107 reads sensor data from the external input-output interface of a sensor (not shown) and sends the sensor data to the packet transmitter 109 for transmission to the gateway 30 or the information collecting device mentioned above. The sensor and the sensor data generator 107 may be identical to equivalent devices used in existing sensor networks.

The control information generator 108 generates control information for insertion into control packets used to measure link costs and exchange routing information with neighboring nodes.

The packet transmitter 109 places the data or information generated by the sensor data generator 107 or control information generator 108 in packets, adds appropriate address information, and sends the packets to the wireless transceiver 103 to be transmitted from the antenna 101. The packet transmitter 109 also passes packets received from the relay processor 105 to the wireless transceiver 103.

Figure 3:
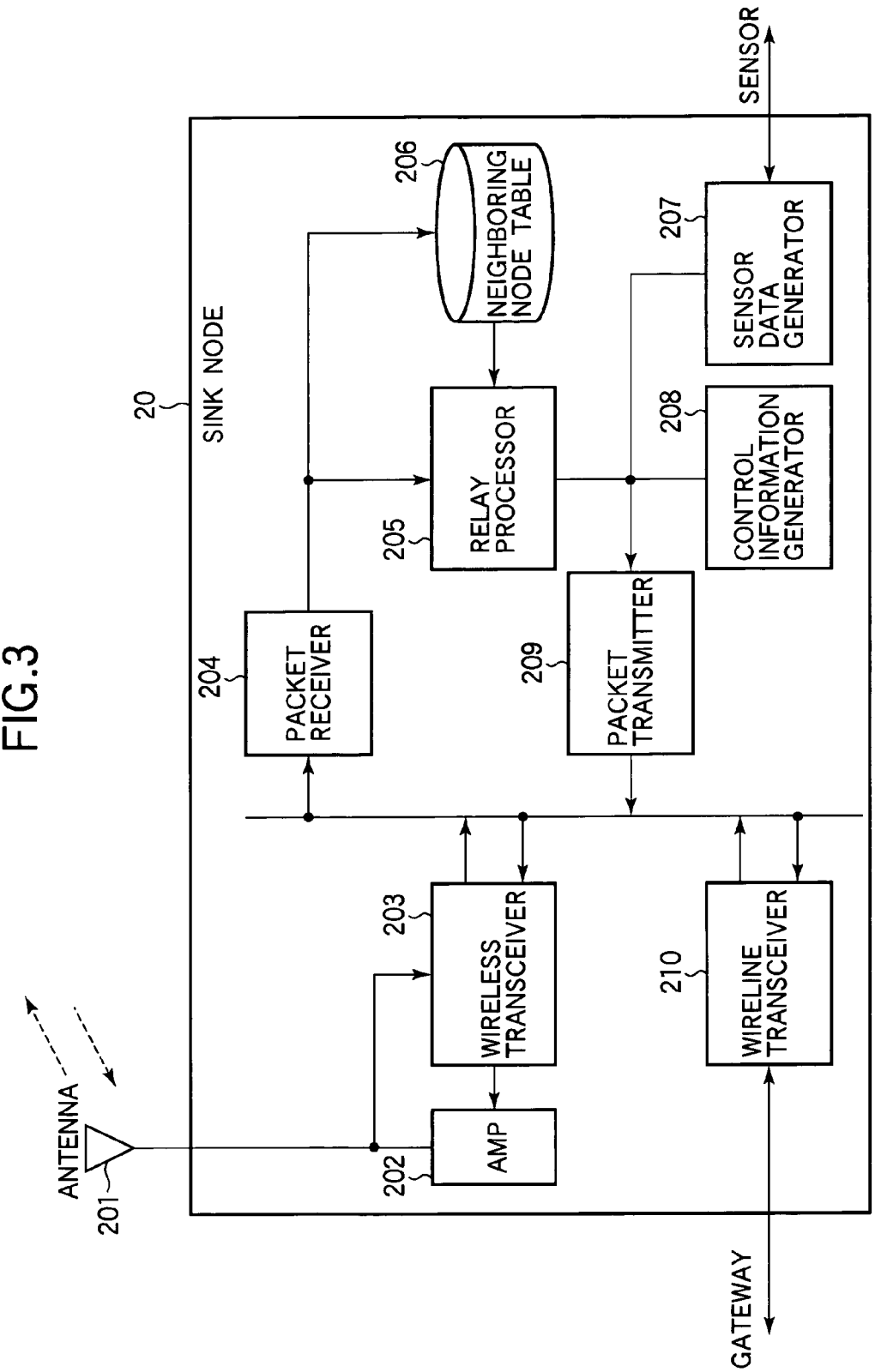
FIG. 3 is a block diagram illustrating the functional structure of the second nodes or sink nodes in the first embodiment.

Referring to FIG. 3, each of the sink nodes 20 includes an antenna 201, an amplifier 202, a wireless transceiver 203, a packet receiver 204, a relay processor 205, a neighboring node table 206, a sensor data generator 207, a control information generator 208, and a packet transmitter 209, which are similar to the corresponding elements in the wireless nodes 10 and will not be described in detail, and a wireline transceiver 210. The sink node 20 may be configured by installing programs with the functions of the necessary blocks in FIG. 3 in a node that already has the interfaces and processors needed for wireless and wireline communication and data processing.

The wireline transceiver 210 communicates with the gateway 30 via the wireline network shown in FIG. 1. The link from the sink node 20 to the gateway 30 shown in FIG. 1 may be selected by a static or dynamic routing control function in the sink node 20.

If the sink node 20 is not connected to a sensor, the sensor data generator 207 may be omitted.

Figure 4:
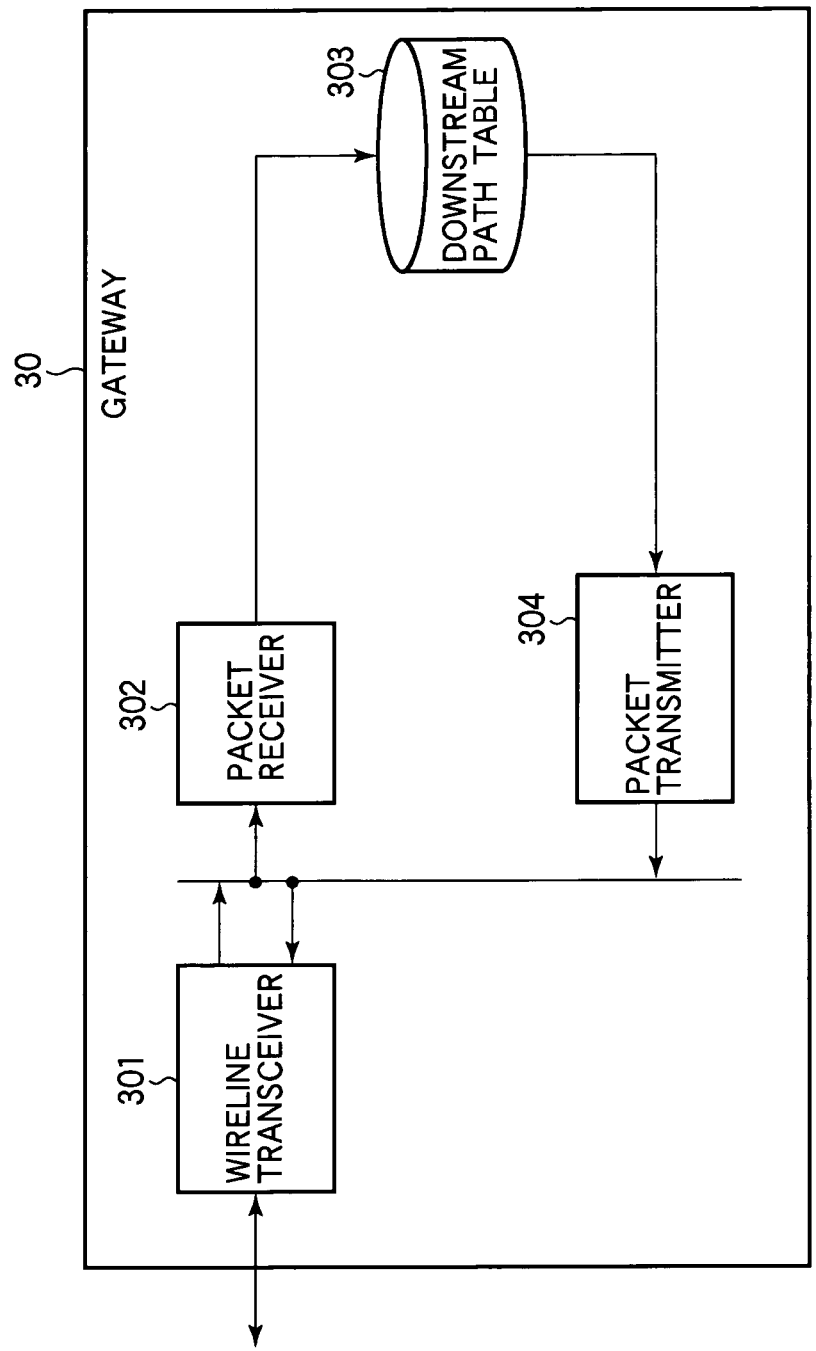
FIG. 4 is a block diagram illustrating the functional structure of the first node or gateway in the first embodiment.

Referring to FIG. 4, the gateway 30 includes a wireline transceiver 301, a packet receiver 302, a downstream path table 303, and a packet transmitter 304. The gateway 30 may be configured by installing programs with the functions of the necessary blocks in FIG. 4 in a node or communication device that already has the interfaces and processors needed for wireline communication and data processing.

The wireline transceiver 301 is a network interface for connection to the wireline network shown in FIG. 1.

The packet receiver 302 analyzes each received packet to determine whether it is a data packet or a control packet, and analyzes the content of control packets. The packet receiver 302 also updates the downstream path table 303 as necessary.

The downstream path table 303 holds downstream routing information describing paths to each of the wireless nodes 10.

The packet transmitter 304 sends control packets and data packets to other nodes.

Next the operation of the wireless communication system 1 will be described, starting with the operations by which each wireless node 10 determines a route for communication with the gateway 30.

Each wireless node 10 periodically transmits control packets referred to as Hello packets to its neighboring nodes, and receives Hello packets from its neighboring nodes. The Hello packets include control information generated by the control information generator 108. Once a wireless node 10 has selected a sink node 20 and a parent node, the control information includes information identifying the selected sink node 20 and parent node, and the path cost of the path between the wireless node 10 and the gateway 30 via these nodes. If the wireless node 10 is within one-hop range of the selected sink node 20, then normally the selected sink node 20 is the parent node. Otherwise, the parent node is the first relay node via which the wireless node 10 will transmit a packet to the selected sink node 20, or to the gateway 30 via the selected sink node 20.

A Hello packet may also include information indicating the period at which the transmitting node transmits Hello packets, and other information such as a sequence number. When a wireless node 10 receives a Hello packet, it stores the included control information in its neighboring node table 106, but does not relay the packet. The time-to-live of a Hello packet is only one hop.

Each sink node 20 transmits Hello packets to its neighboring wireless nodes 10. The control information in these Hello packets includes the path cost of the path between the sink node 20 and the gateway 30.

Each wireless node 10 calculates the link cost of its link with each neighboring node from the reception status of the Hello packets it receives on the link. The link cost can be calculated from the percentage of Hello packets that are received successfully or, conversely, from an error rate. Alternatively, the link cost may be calculated from the electric field strength of the received signal, or in various other ways.

Figure 5:
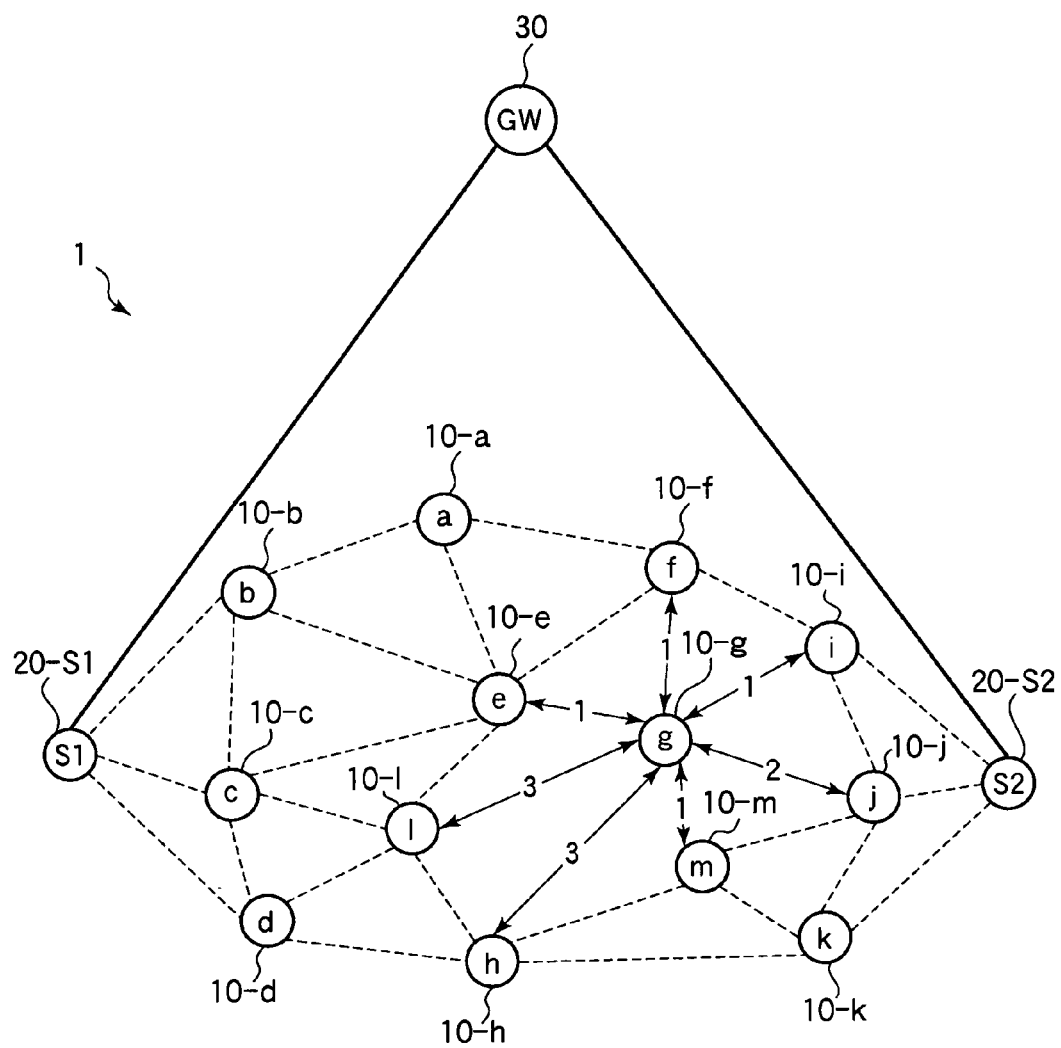
FIGS. 5 to 8 illustrate the operation of the wireless communication system in FIG. 1.

In FIG. 5, wireless node 10-g has exchanged Hello packets with its neighboring wireless nodes 10-e, 10-f, 10-h, 10-i, 10-j, 10-l, 10-m, as indicated by the double-headed arrows, and has calculated the link costs-indicated by the numbers in these arrows.

Figure 6:
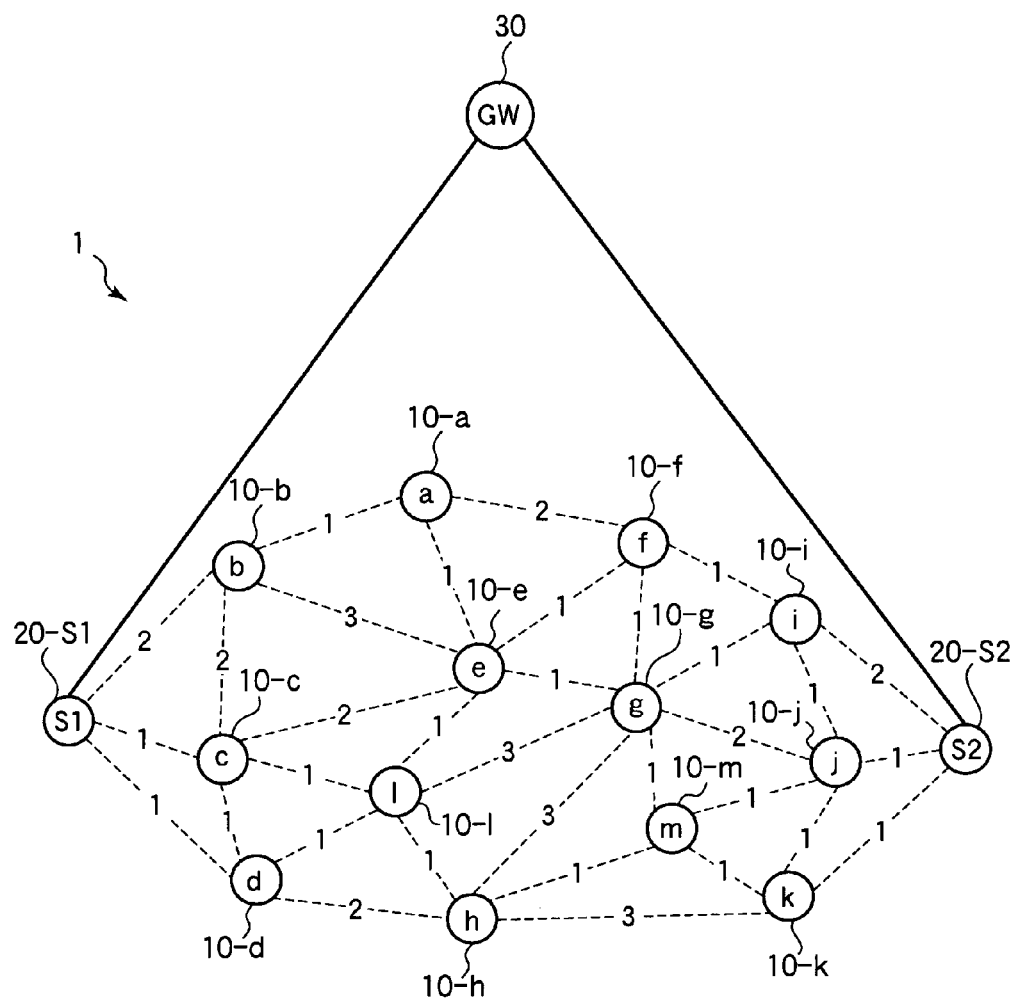

In FIG. 6, the other wireless nodes 10 have exchanged Hello packets and calculated link costs for their wireless links as indicated by the numbers on the dotted lines. So far, only the link costs have been calculated. The wireless nodes 10 have not yet selected their parent nodes and connected sink nodes 20.

Next, to establish the wireless routing paths in the network, the gateway 30 sends Hello packets to the sink nodes 20 on the wireline network. These Hello packets include sequence numbers. The gateway 30 sends Hello packets with identical sequence numbers to both sink nodes 20-S1, 20-S2. The path cost in these packets is set to an initial value of '1'. In each sink node 20, the Hello packet is received by the wireline transceiver 210, converted by the wireless transceiver 203 to wireless signal form, and transmitted to the neighboring wireless nodes 10. The initial path cost of '1' is the link cost of the link between the gateway 30 and each sink node 20.

In a variation of this scheme, the cost of the path between the gateway 30 and the sink nodes 20 does not have a fixed value. Each sink node 20 calculates the path cost in a way generally similar to the way in which the wireless nodes 10 calculate their link costs (from the error rate in Hello packets received from the gateway 30, for example). Alternatively, the sink node 20 or gateway 30 may calculate the path cost from the number of hops on the path from the gateway 30 to the sink node 20 in the wireline network. If the sink node 20 calculates the path cost value, then the gateway 30 may set an initial path cost of '0' in the Hello packet and the sink node 20 may update the path cost by adding the calculated value before transmitting the Hello packet to its neighboring wireless nodes 10.

The nodes neighboring the sink nodes 20 proceed to calculate their path costs on the basis of the path cost in the Hello packets received from the sink nodes 20. For example, the wireless nodes 10-b, 10-c, and 10-d that neighbor sink node 20-S1 add link costs of '2', '1', and '1', respectively, to the path cost ('1') in the received Hello packet to obtain path costs of '3', '2', and '2'. From a subsequent Hello packet transmitted from wireless node 10-c, wireless node 10-d learns that the cost of the path from wireless node 10-c to the gateway 30 is '2'. By adding the link cost ('1') of the link between wireless nodes 10-c and 10-d, wireless node 10-d can calculate that the path cost of routing a packet to or from the gateway 30 via wireless node 10-c would be '3'. Since the path cost of routing the packet directly via sink node 20-S1 is '2', wireless node 10-d selects sink node 20-S1 as its parent node and sets control information indicating this selection and a path cost of '2' in the Hello packets it transmits afterward.

Figure 7:
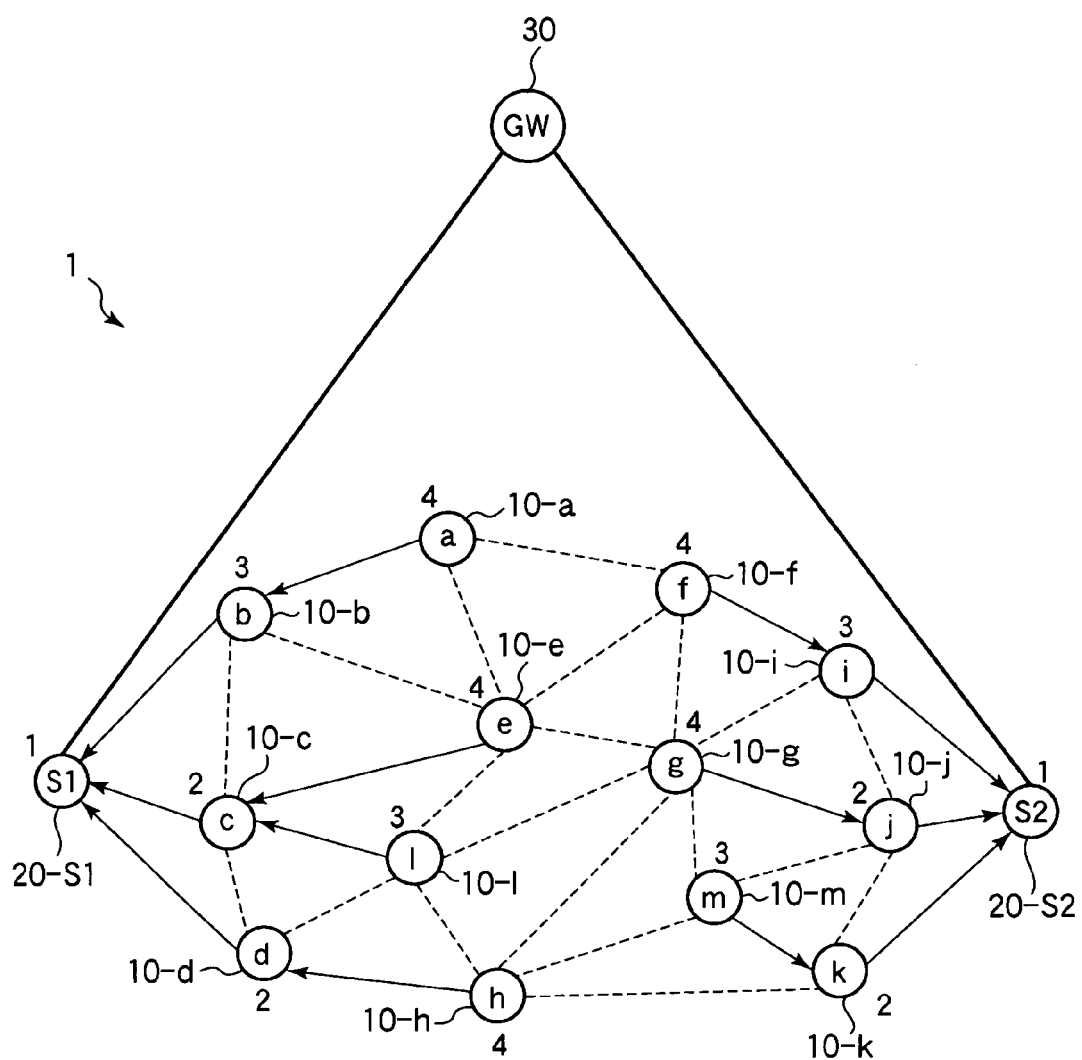

In FIG. 7, the other wireless nodes 10 have performed similar path cost calculations and selected their parent nodes. The arrows point from each wireless node 10 to its parent node and the numbers beside the wireless nodes 10 are the path costs to or from the gateway 30. By choosing a parent node in this way, each wireless node 10 chooses a connection to the sink node 20 that provides the lowest path cost, and the connections are evenly balanced between the two sink nodes 20.

After making these route selections by choosing a connected sink node and parent node, each wireless node 10 sends a packet (such as a route record or RREC packet, as assumed below) to the gateway 30 to inform the gateway 30 of the downstream path to the wireless node 10. The downstream path table 303 at the gateway 30 is updated on the basis of these RREC packets. When a wireless node 10 switches its connection (by changing its parent node, or its parent node and connected sink node 20), the wireless node 10 sends a similar packet to the gateway 30.

Alternatively, each sink node 20 may maintain a table similar to the downstream path table 303 at the gateway 30 and send the information in this table to the gateway 30, in which case the wireless node 10 sends the RREC packet to the sink node 20.

Even after all routes are established, the wireless nodes 10 and sink nodes 20 continue to transmit Hello packets periodically, and the wireless nodes may change their sink and parent node selections if the path costs change. Routing packets such as RREC packets are transmitted only when a new parent node is selected.

Next the operation when a sink node 20 fails will be described.

Figure 8:
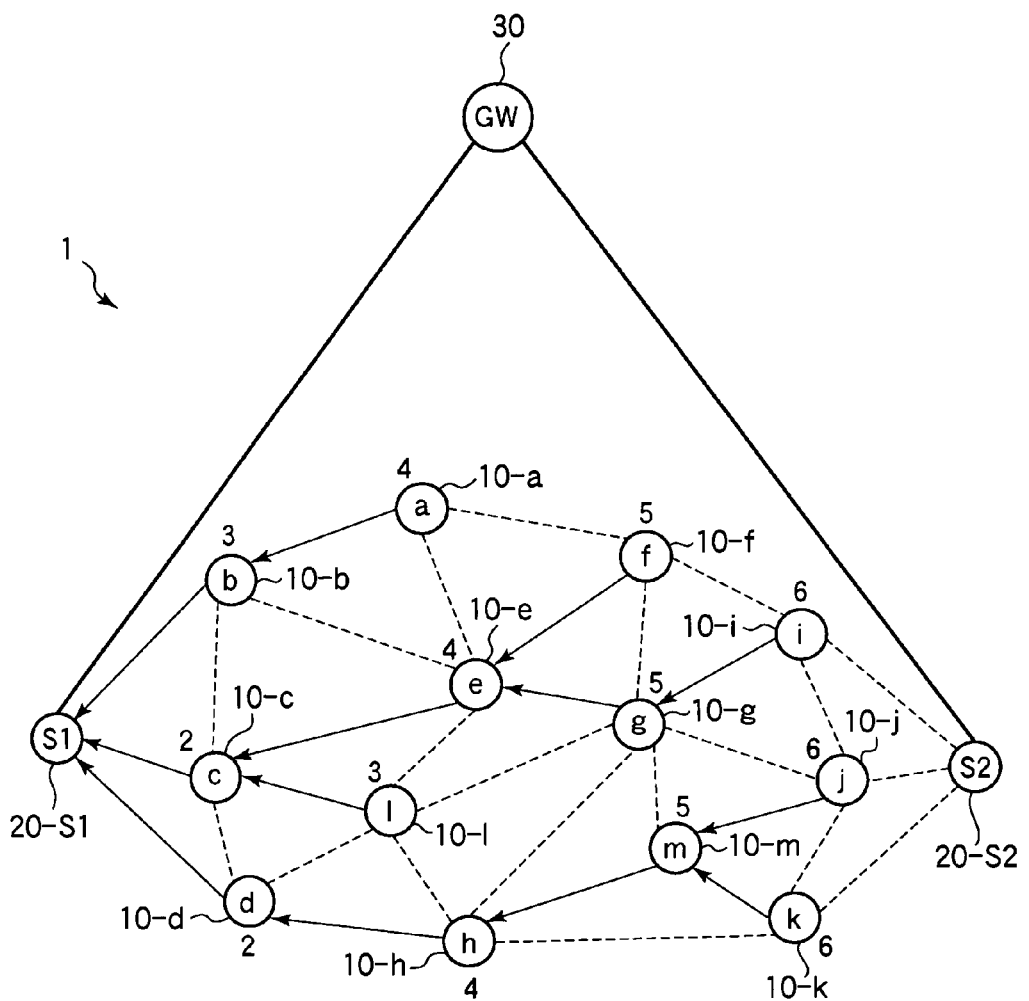

In FIG. 8, a failure has occurred at sink node 20-S2, and the wireless nodes 10 neighboring sink node 20-S2 have stopped receiving Hello packets from sink node 20-S2. As a result, these neighboring wireless nodes 10 must stop attempting to communicate via sink node 20-S2.

In one exemplary scheme, a wireless node 10 that fails to receive Hello packets for a predetermined time on a particular link increases the link cost of that link. This scheme will be assumed in the following description.

As Hello packets fail to arrive, the link costs at wireless nodes 10-i, 10-j, and 10-k, which were '2', '1', and '1' in FIG. 6, gradually rise, and the increased link costs are reported as increased path costs in the Hello packets that wireless nodes 10-i, 10-j, and 10-k transmit to other nodes. Eventually, at wireless node 10-g, for example, the path cost of using wireless node 10-j as a parent node becomes greater than the path cost of using wireless node 10-e as a parent node. This path cost is '5', which is the sum of the path cost ('4') from wireless node 10-e to the gateway 30 and the link cost ('1') from wireless node 10-g to wireless node 10-e. At this point wireless node 10-g switches its parent node selection to node 10-e, and its sink node selection to node 20-S1. For similar reasons, the other wireless nodes 10-f, 10-i, 10-j, 10-k, 10-m that were connected to sink node 20-S2 switch to parent nodes with lower path costs and reconnect to sink node 20-S1.

FIG. 8 shows the result after all these changes have been made. All the wireless nodes 10 are now connected to the gateway 30 via sink node 20-S1.

As the above example shows, when a failure occurs at a sink node 20, the wireless nodes 10 can switch their routes to the gateway 30 autonomously.

One effect of the first embodiment is that since the wireless nodes 10 select their paths to the gateway 30 through the routine exchange of Hello packets between neighboring nodes, routing control is accomplished without flooding the wireless communication system 1 with special routing control packets. This is possible because the Hello packets include path cost information.

In particular, no sink node 20 has to broadcast routing control information to all wireless nodes 10. A sink node's Hello packets only have to reach the neighboring wireless nodes.

Another effect of the first embodiment is that when a failure occurs at a sink node 20, the wireless nodes 10 that were connected to that sink node 20 can switch their connections by an autonomous scheme, so the switchovers can be effected at each wireless node 10 without the need for special control packets, such as the control packets broadcast in conventional communication systems.

Second Embodiment

Figure 9:
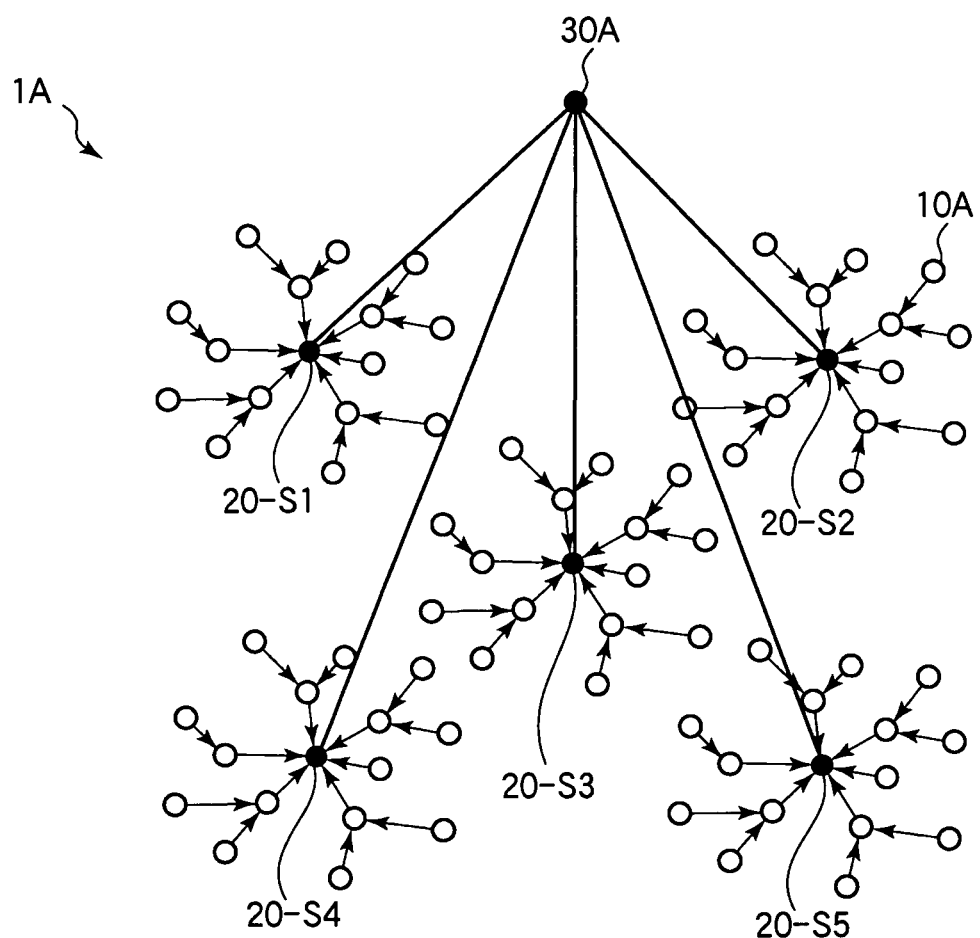
FIG. 9 illustrates the overall structure of a wireless communication system according to a second embodiment of the invention.

Referring to FIG. 9, the wireless communication system 1A in the second embodiment includes a gateway 30A and five sink nodes 20-S1, 20-S2, 20-S3, 20-S4, 20-S5. A plurality of wireless nodes 10A are connected to each sink node 20.

Figure 10:
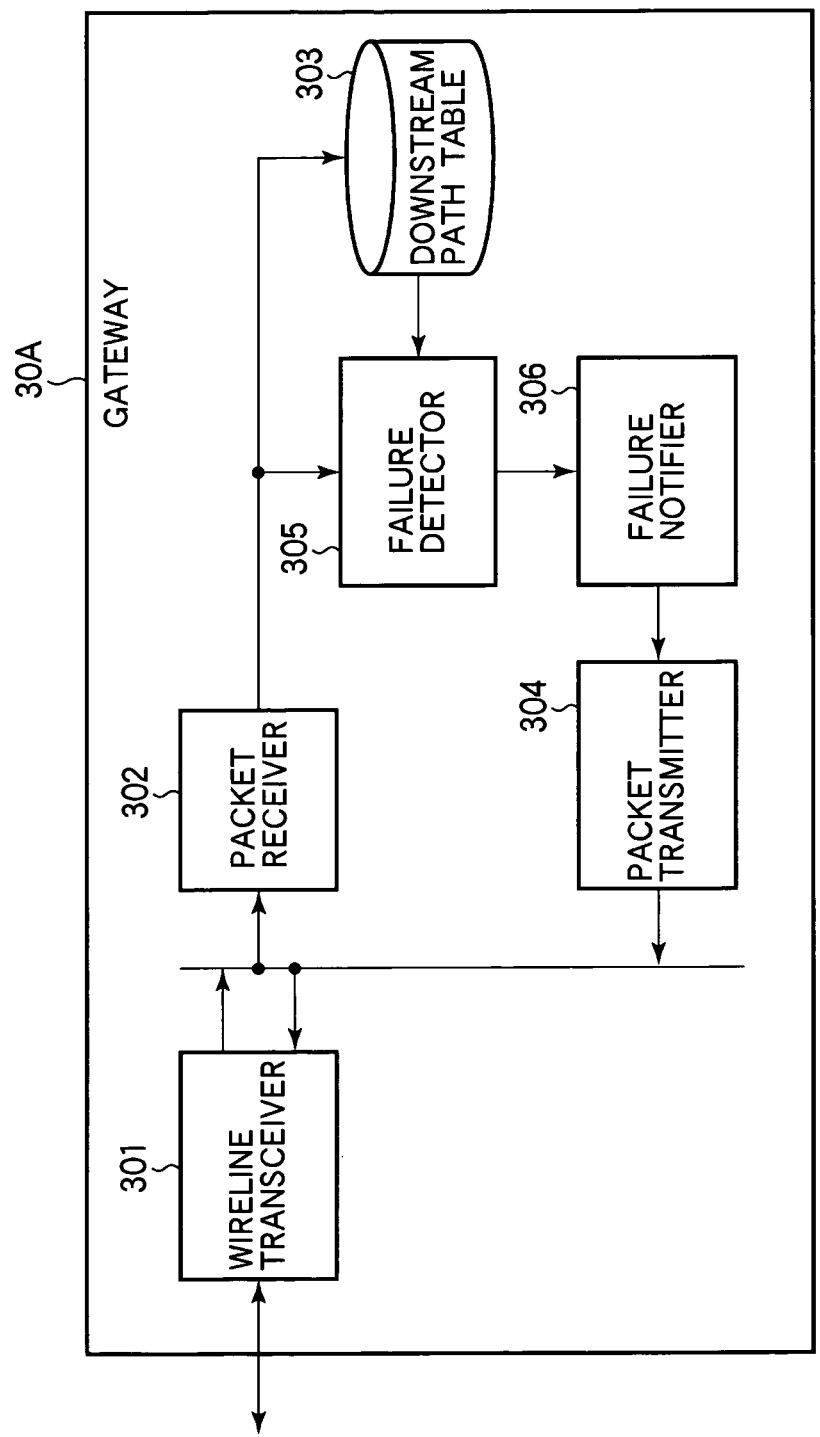
FIG. 10 is a block diagram illustrating the functional structure of the gateway in FIG. 9.

Referring to FIG. 10, the gateway 30A includes a wireline transceiver 301, a packet receiver 302, a downstream path table 303, and a packet transmitter 304, which operate substantially as described in the first embodiment, and a newly added failure detector 305 and failure notifier 306.

The failure detector 305 detects failures of the sink nodes 20. When a failure is detected, the failure notifier 306 generates a control packet referred to below as a failure notification packet and sends it via the packet transmitter 304 and active sink nodes 20 to the wireless nodes 10A.

Next the operation of the second embodiment will be described, starting from the state depicted in FIG. 9.

At regular intervals, the failure detector 305 in the gateway 30A decides whether each sink node 20 is operating normally. This decision can be made by, for example, having the sink nodes 20 transmit 'I'm alive' signals to the gateway 30A at regular intervals, or having the gateway 30A poll the sink nodes 20 at regular intervals. Alternatively, the sink nodes 20 may exchange Hello packets with the gateway 30A, and the decision that a sink node 20 has failed can be made when Hello packets fail to arrive from the sink node 20 for a predetermined period.

Suppose now that in the state in FIG. 9, the gateway 30A is unable to confirm that sink node 20-S3 is operating normally. To inform the wireless nodes 10A that sink node 20-S3 has failed, the gateway 30A uses its failure notifier 306 to broadcast a failure notification packet to the other sink nodes 20-S1, 20-S2, 20-S4, 20-S5. The failure notification packet includes information such as, for example, an address or domain name identifying sink node 20-S3.

Figure 11:
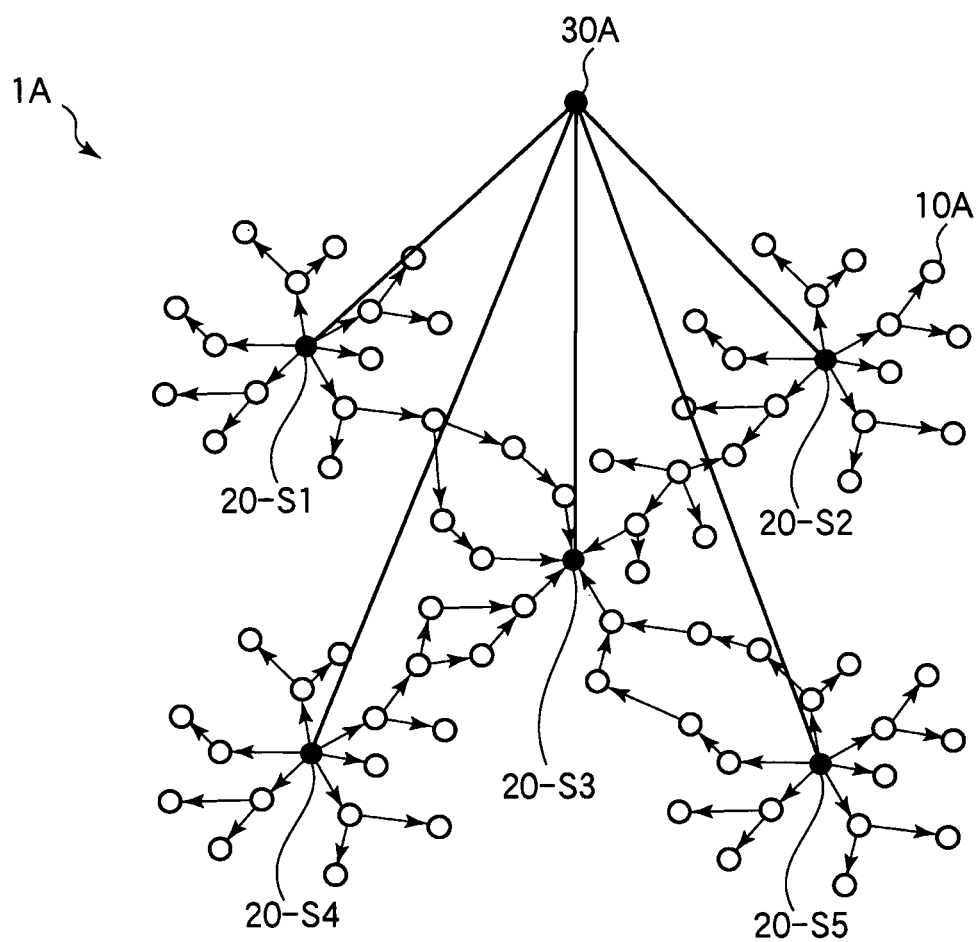
FIG. 11 illustrates a failure notification operation in the wireless communication system in FIG. 9.

This failure notification packet is relayed by flooding from sink nodes 20-S1, 20-S2, 20-S4, 20-S5 to all the wireless nodes 10A, including the wireless nodes 10A connected to the failed sink node 20-S3, as indicated by the arrows in FIG. 11.

Figure 12:
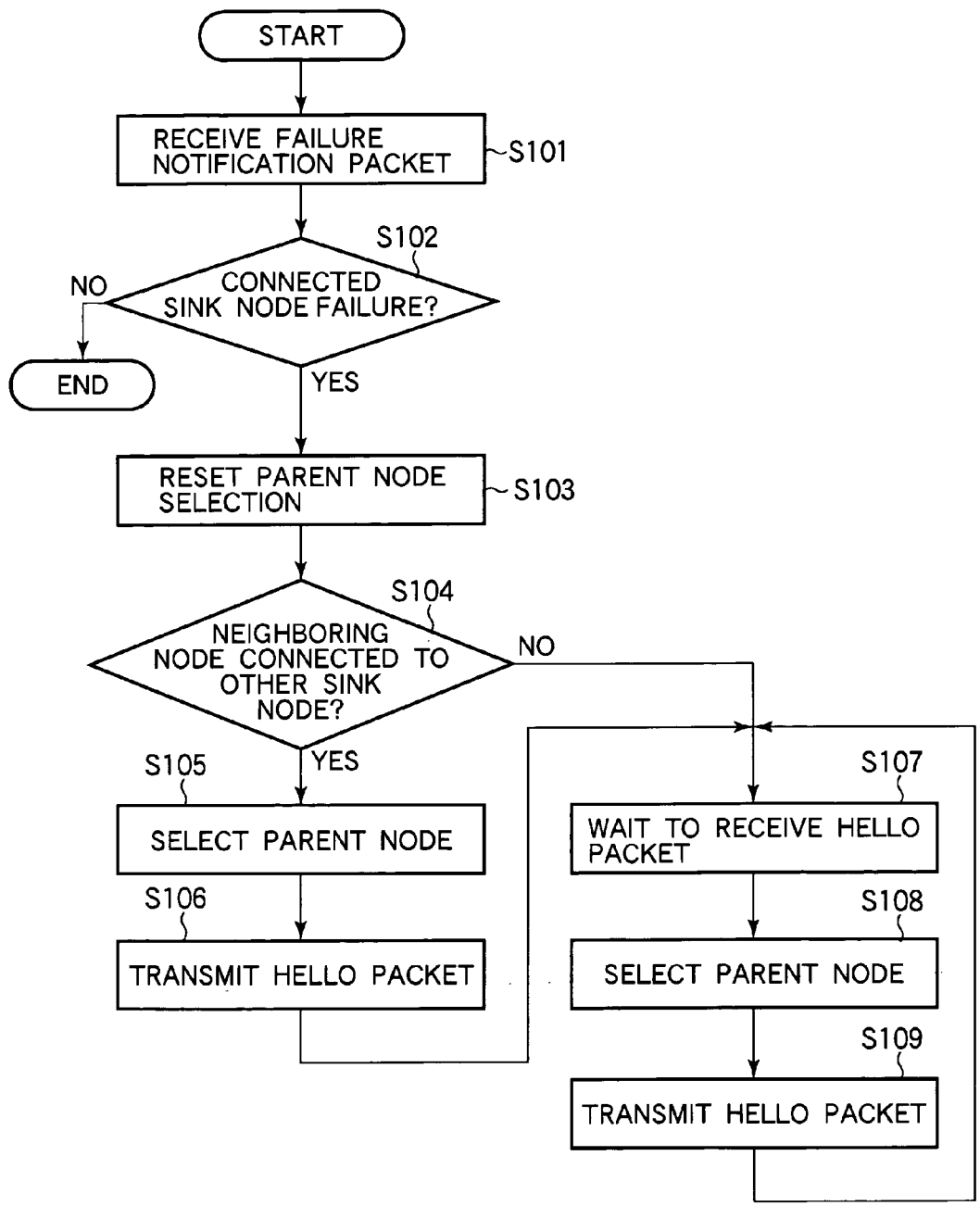
FIG. 12 is a flowchart illustrating the operation of wireless nodes following the notification in FIG. 11.

Referring to the flowchart in FIG. 12, when a wireless node 10A receives the failure notification packet (step S101), it uses the information in the packet to decide whether it is connected to the failed sink node 20-3 (step S102). If in step S102 the wireless node 10A finds that it is not connected to the failed sink node 20-3, the process ends.

If the wireless node 10A is connected to the failed sink node 20-3, then it resets (cancels) its parent node selection (step S103) to avoid relaying packets toward the failed sink node 20-3. Next, it searches its neighboring node table 106 to determine whether any of its neighboring nodes is connected to a sink node 20 other than the failed sink node 20-3 (step S104). If one or more neighboring wireless nodes are connected to a sink node 20 other than the failed sink node 20-3, then from among those neighboring nodes, the wireless node 10A selects the node with the lowest path cost as a new parent node (step S105), connects to the sink node 20 to which the new parent node is connected, updates its own path cost by adding the link cost of the link to the new parent node to the path cost in the Hello packets received from the new parent node, transmits a Hello packet announcing its new parent node, newly connected sink node 20, and new path cost (step S106), and waits to receive a Hello packet from some one of its neighboring nodes (step S107).

If none of the neighboring nodes are connected to a sink node 20 other than the failed sink node 20-3, then the wireless node 10A proceeds directly from step S104 to step S107 and waits to receive a Hello packet.

When the wireless node 10A receives a Hello packet in step S107, it updates the information in its neighboring node table 106, then repeats the process of selecting the neighboring node that is not connected to the failed sink node 20-3 and has the lowest path cost as a new parent node (step S108), updates its own path cost, transmits a Hello packet announcing its new parent node, connected sink node 20, and path cost again (step S109), and returns to step S107 to wait to receive further Hello packets.

The loop from step S107 to step S109 may be allowed to continue indefinitely. Alternatively, the loop may be terminated when a predetermined time has elapsed from reception of the failure notification packet, or each wireless node may terminate the loop as soon as it has selected a new parent node and connection and transmitted a Hello packet.

Figure 13:
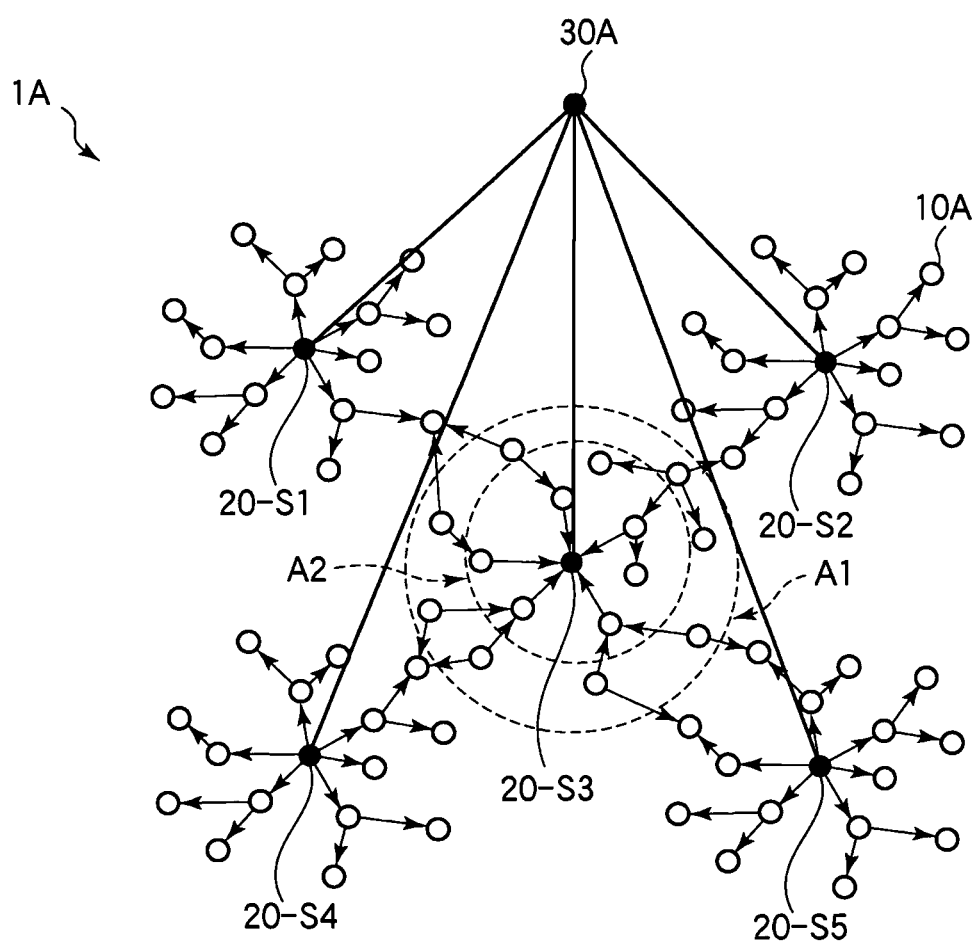
FIGS. 13 and 14 illustrate the reconnection operation following the notification in FIG. 11.

In FIG. 13, when notified of the failure at sink node 20-S3, the wireless nodes 10A in area A1 find that they are connected to the failed wireless node. Of the wireless nodes 10A in area A1, the wireless nodes in area A2 do not immediately find a neighboring wireless node 10A that is not connected to the failed sink node 20-S3. The other wireless nodes in area A1, however, find neighboring wireless nodes that are not connected to the failed sink node 20-S3, switch their parent node selections to one or another of those neighboring wireless nodes 10A, switch their sink node connections, and transmit Hello packets announcing their new parent nodes and connected sink nodes. The arrows in FIG. 13 represent the transmission of Hello packets.

The transmitted packets are received by some of the wireless nodes 10A in area A2. These wireless nodes 10A then similarly switch their parent node selections and sink node connections and transmit Hello packets, which are received by the remaining wireless nodes 10A in area A2. In FIG. 13 it takes only two Hello packet transmission stages for all the wireless nodes 10A in area A1 to find new paths to the gateway 30A via sink nodes 20 that are still operating.

Figure 14:
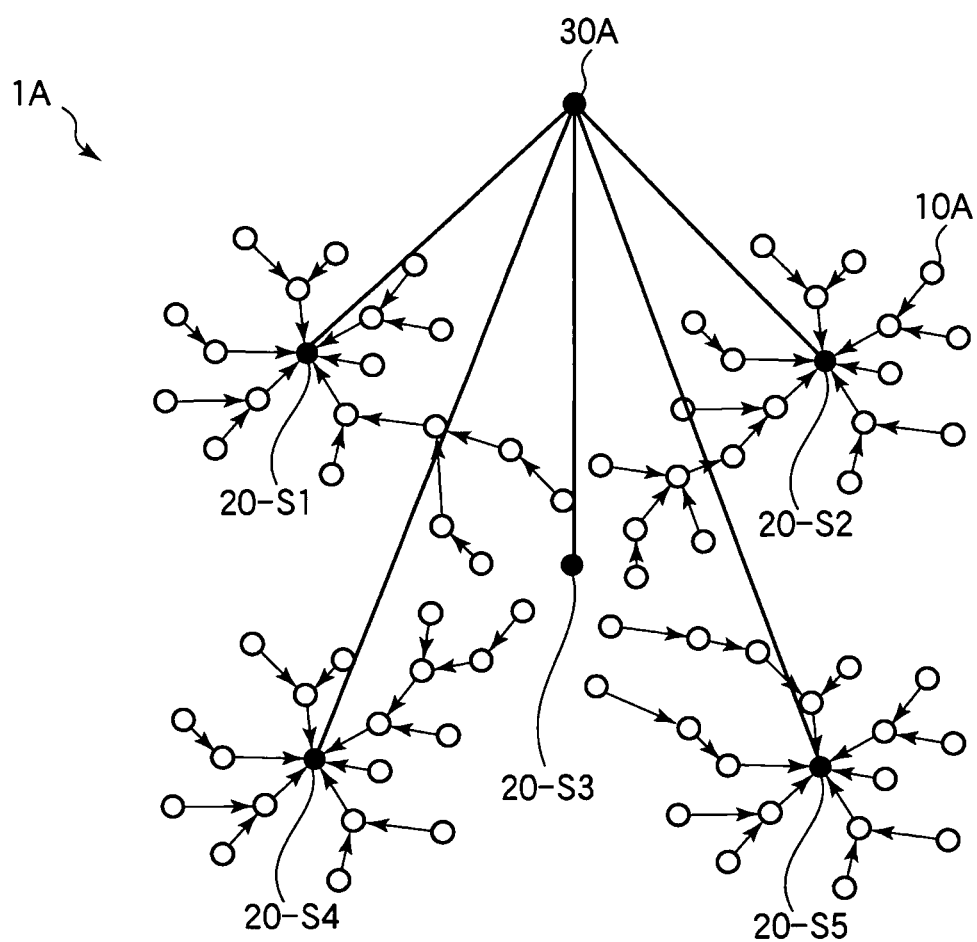

The arrows in FIG. 14 indicate the parent node selections in the final state reached after the failure at sink node 20-S3. All the wireless nodes 10A that were formerly connected to sink node 20-S3 are now connected to other sink nodes 20 via minimum-cost paths.

When sink node 20-S3 recovers, it will transmit Hello packets to its neighboring wireless nodes 10A, and these wireless nodes will switch their connections back to sink node 20-S3 to take advantage of the lower path cost this affords. Other nodes in the surrounding area (e.g., area A1 in FIG. 13) will then autonomously switch their connections back to sink node 20-S3 as Hello packets with lower path costs propagate outward, until a connection state similar to the state shown in FIG. 9 is restored.

When a failure at a sink node occurs, the second embodiment speeds up the process of dealing with the failure by having the gateway 30A detect the failure and notify all the wireless nodes 10A at once, so that they can promptly begin the autonomous switching of their connections.

Third Embodiment

The third embodiment is similar to the second embodiment but employs modified wireless nodes.

Figure 15:
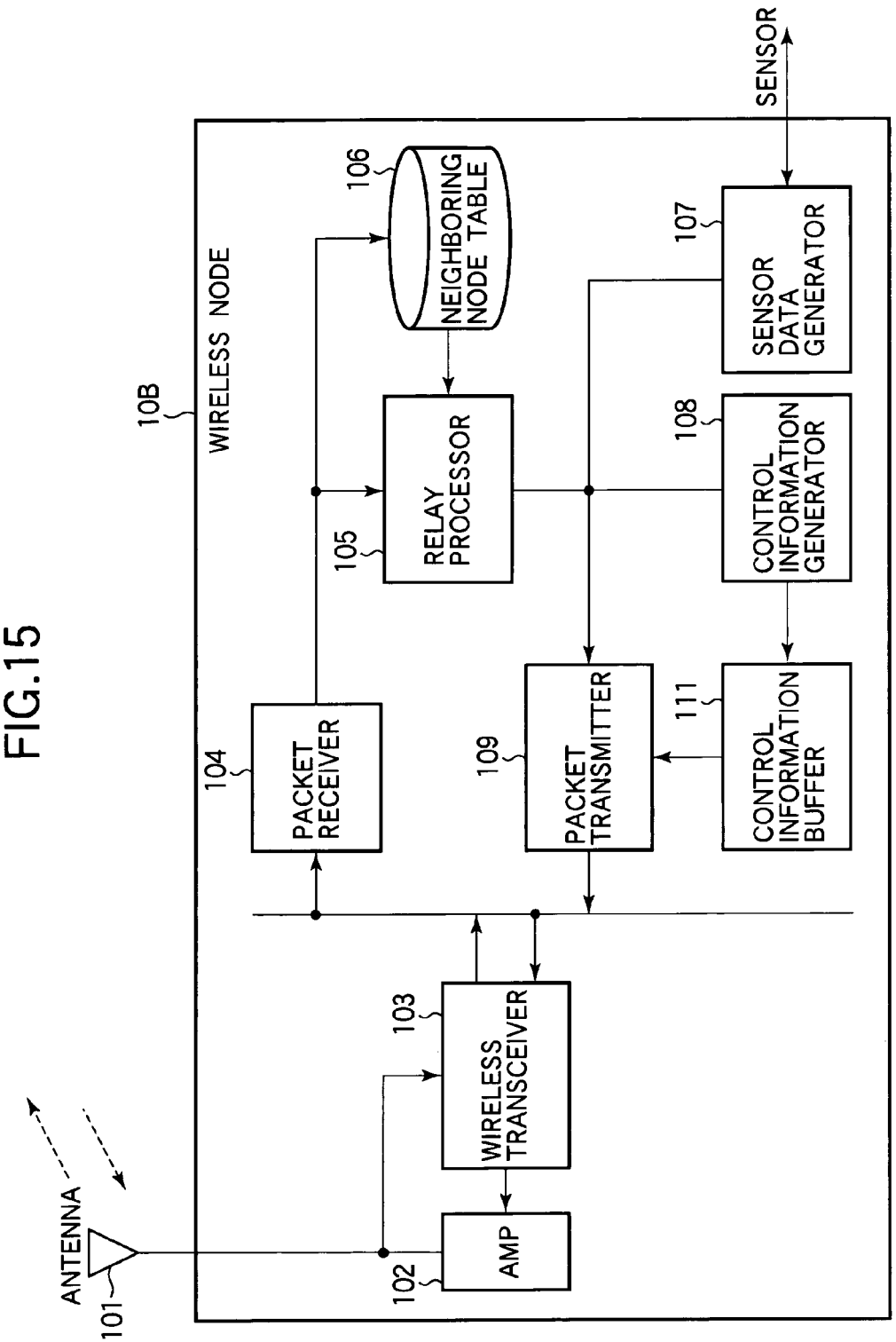
FIG. 15 is a block diagram illustrating the functional structure of the wireless nodes in a wireless communication system in a third embodiment of the invention.

Referring to FIG. 15, each of the wireless nodes 10B in the third embodiment is generally similar to the wireless nodes in the preceding embodiments but includes an additional control information buffer 111 disposed between the control information generator 108 and the packet transmitter 109. When the control information generator 108 generates a packet such as an RREC packet to be sent to the gateway 30A or to a sink node 20 to establish a downstream path, the control information buffer 111 may store the packet for a prescribed time before passing the packet to the packet transmitter 109. The prescribed time may be fixed or variable.

Figure 16:
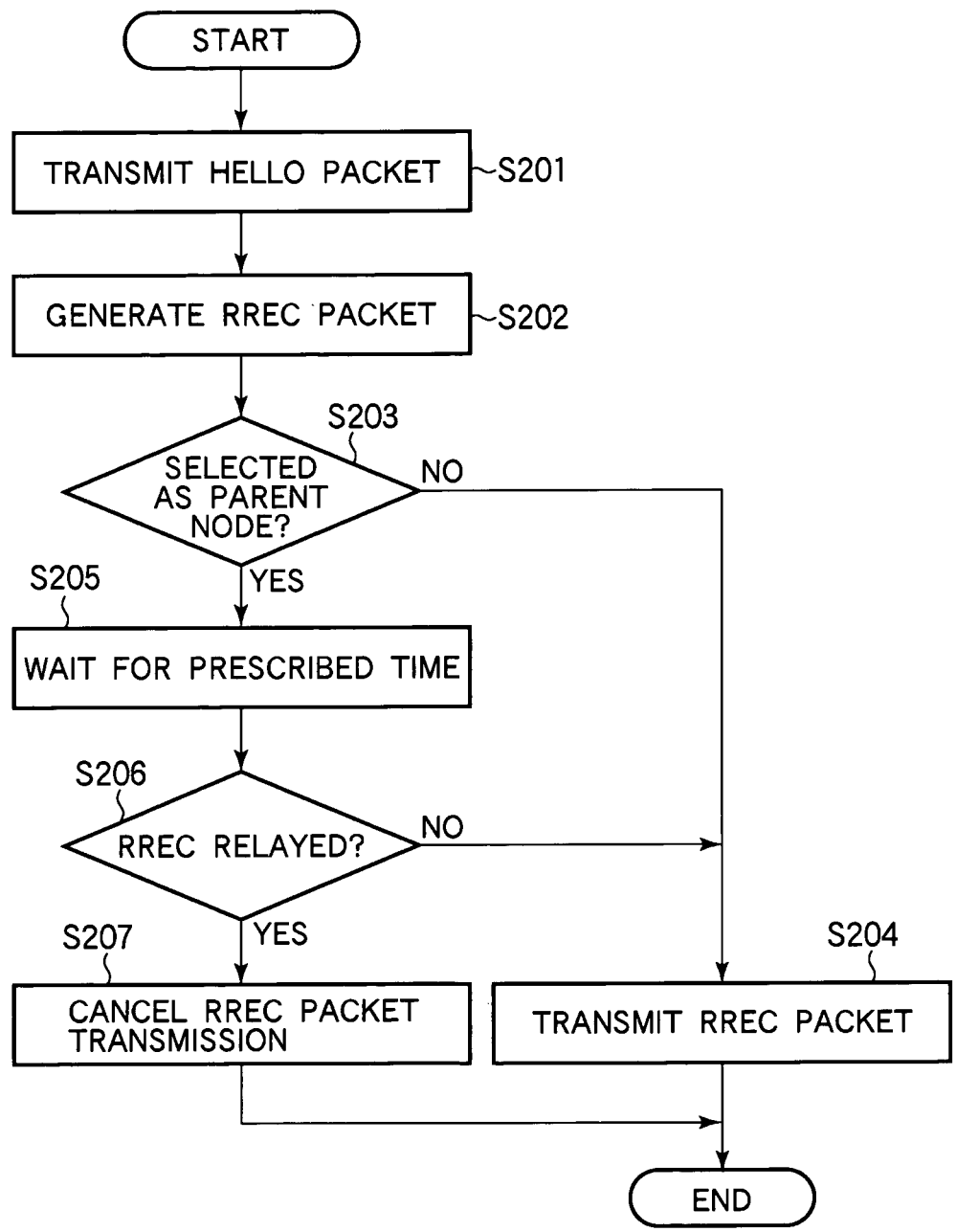
FIG. 16 is a flowchart illustrating the operation of a wireless nodes in the third embodiment.

The third embodiment operates in the same way as the second embodiment except for the transmission of Hello packets following a change of route to the gateway 30A. The following description will therefore focus on the process following the transmission of a Hello packet including new control information in step S106 or step S108 in FIG. 12. The transmission of this packet is shown as step S201 in FIG. 16.

Following step S201, the control information generator 108 in the wireless node 10B generates an RREC packet to inform the gateway 30A of the new downstream route and places the RREC packet in the control information buffer 111 (step S202). Next, the wireless node 10B refers to the information in Hello packets received from its neighboring nodes and stored in the neighboring node table 106 to decide whether or not it has been selected as a parent node by any of its neighboring wireless nodes (step S203).

If the wireless node 10B is not selected as a parent node by any neighboring node, the RREC packet is immediately passed from the control information buffer 111 to the packet transmitter 109 and transmitted (step S204).

If the wireless node 10B is selected as a parent node by some neighboring node, the RREC packet is kept in the control information buffer 111 for the prescribed time (step S205). If the prescribed time is not fixed, it may be determined from the distance between the wireless node 10B and the sink node 20 to which the wireless node 10B was connected before the connection was changed. The distance may be calculated as the number of hops on the old path from the wireless node 10B to the sink node. In one preferred scheme, the prescribed time increases as the number of hops increases. This will generally have the effect of shortening the prescribed time as the number of hops on the new path to the newly connected sink node 20 increases, so that wireless nodes 10B farther from the new sink node 20 transmit RREC packets before wireless nodes 10B closer to the new sink node 20.

At the end of the prescribed time, the wireless node 10B decides whether not it has relayed an RREC packet within the prescribed time (step S206). If not, the RREC packet held in the control information buffer 111 is transmitted in step S204. If the wireless node 10B has already relayed an RREC packet, however, it cancels the transmission of the RREC packet held in the control information buffer 111 (step S207), because the gateway 30A has already learned of the new path to the wireless node 10B from the RREC packet relayed earlier.

If the prescribed time decreases with increasing distance from the newly connected sink node 20, the effect of the above operation is that the gateway 30A receives RREC packets only from leaf nodes, that is, only from the wireless nodes 10B that are situated at the ends of the downstream routes as seen from the gateway 30A. The amount of RREC traffic is thereby minimized, in contrast to conventional schemes in which all wireless nodes that have changed their connections transmit RREC packets.

By reducing the amount of RREC traffic in the network, the third embodiment increases the throughput of data packets, and can avoid heavy concentrations of traffic on sink nodes 20 that take over connections from a failed sink node.

The embodiments described above may be modified in various ways. For example, the wireless nodes 10B in the third embodiment may be used in place of the wireless nodes 10 in the first embodiment. The connections between the gateway and the sink nodes may be wireless connections instead of wireline connections.

The wireless nodes need not be sensor nodes. The invention is applicable to any type of wireless nodes, including client nodes that connect to a server node through a gateway.

Those skilled in the art will recognize that further variations are possible within the scope of the invention, which is defined in the appended claims.

What is claimed is:
1. A wireless communication system, comprising:
a first node;
a plurality of second nodes; and
a plurality of third nodes, wherein
the third nodes communicate with the first node through the second nodes,
each second node transmits control information to neighboring third nodes,
each third node transmits control information to neighboring second and third nodes,
each third node calculates link costs of single-hop wireless links with its neighboring nodes from a reception status of the control information,
the control information transmitted by each second node includes a path cost indicating a cost of a path between the first node and the second node,
the control information transmitted by each third node includes a path cost indicating a cost of a path between the first node and the third node, calculated by adding the link cost of a link by which the third node receives control information from one of the second or third nodes to the path cost included in the received control information,
each third node uses the received control information to select one of the second nodes through which to communicate with the first node and select one of the second or third nodes as a parent node serving as a destination of a first hop when the third node communicates with the first node,
when one of the second nodes has failed, the first node detects the failed second node and notifies the third nodes of the failed second node,
after selecting parent nodes, the third nodes transmit routing information to the first node,
when one of the third nodes selects a different second node in response to notification of a failed second node,
if said one of the third nodes is selected as a parent node by another one of the third nodes, said one of the third nodes delays transmission of the routing information for a prescribed time, but
if said one of the third nodes is not selected as a parent node by any other one of the third nodes, said one of the third nodes transmits the routing information immediately, and
the prescribed time increases with increasing distance from the failed second node.
2. The wireless communication system of claim 1, wherein the control information transmitted by each third node also includes information identifying the second node selected by the third node.

3. The wireless communication system of claim 1, wherein the control information transmitted by each third node also includes information identifying the parent node selected by the third node.

4. The wireless communication system of claim 1, wherein the first node also transmits control information, and the second nodes transmit the control information to the neighboring third nodes by relaying the control information received from the first node.

5. The wireless communication system of claim 4, wherein the first node sets an initial path cost in the control information, and the second nodes add the costs of their respective paths to the first node to obtain the path costs included in the control information transmitted to the neighboring third nodes.

6. The wireless communication system of claim 1, wherein the third nodes calculate the link costs from at least a length of time over which no control information is received.

7. The wireless communication system of claim 1, wherein, when notified of the failed second node, each one of the third nodes that selected the failed second node selects a different second node and selects a new parent node.

8. The wireless communication system of claim 1, wherein the routing information is route record information.

9. The wireless communication system of claim 1, wherein the distance from the failed second node is measured in hops.

10. The wireless communication system of claim 1, wherein the first node comprises a transmitter for transmitting control information including an initial path cost to the second nodes.

11. The wireless communication system of claim 10, wherein the first node further comprises:
   a receiver for receiving routing information transmitted by the third nodes via the second nodes; and
   a downstream path table for storing the routing information.

12. The wireless communication system of claim 10, wherein the first node further comprises:
   a receiver for receiving information from the second nodes;
   a failure detector for detecting failed second nodes from the received information; and
   a failure notifier for notifying the third nodes of the failed second nodes detected by the failure notifier.

13. The wireless communication system of claim 1, wherein each second node comprises:
   a control information generator for generating the control information transmitted to the third nodes;
   a transmitter for transmitting information to the first and third nodes; and
   a receiver for receiving information from the first and third nodes.

14. The wireless communication system of claim 1, wherein each third node comprises:
   a receiver for receiving the control information and calculating the link costs of the single-hop wireless links via which the control information is received from the neighboring second or third nodes;
   a relay processor for selecting the parent node and the one of the second nodes through which to communicate with the first node; and
   a control information generator for adding the link costs of the links by which the control information is received to the path costs in the received control information to generate the control information sent to other third nodes in the wireless communication system.

15. The wireless communication system of claim 14, wherein each third node further comprises a buffer for temporarily storing the control information generated by the control information generator to delay transmission of the control information when the third node is notified that the second node it has selected has failed and the relay processor selects a different second node, if the third node is selected as a parent node of another third node in the wireless communication system.

* * * * *